United States Patent
Lee et al.

(10) Patent No.: US 10,866,817 B2
(45) Date of Patent: Dec. 15, 2020

(54) COMPUTING SYSTEM, AND DRIVING METHOD AND COMPILING METHOD THEREOF

(71) Applicant: SAMSUNG ELECTRONICS CO., LTD., Suwon-si (KR)

(72) Inventors: Seung-won Lee, Hwaseong-si (KR); Chae-seok Im, Yongin-si (KR); Seok-hwan Jo, Suwon-si (KR); Suk-jin Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 16/084,906

(22) PCT Filed: Mar. 14, 2016

(86) PCT No.: PCT/KR2016/002519
§ 371 (c)(1),
(2) Date: Sep. 13, 2018

(87) PCT Pub. No.: WO2017/159885
PCT Pub. Date: Sep. 21, 2017

(65) Prior Publication Data
US 2019/0079779 A1 Mar. 14, 2019

(51) Int. Cl.
*G06F 9/44* (2018.01)
*G06F 9/445* (2018.01)
(Continued)

(52) U.S. Cl.
CPC ......... *G06F 9/44521* (2013.01); *G06F 8/41* (2013.01); *G06F 9/30043* (2013.01);
(Continued)

(58) Field of Classification Search
CPC .................................................... G06F 9/3867
(Continued)

(56) References Cited

U.S. PATENT DOCUMENTS 5,815,718 A 9/1998 Tock
6,647,443 B1 * 11/2003 Schultz ............... H04L 12/5601
710/33
(Continued)

FOREIGN PATENT DOCUMENTS

EP 1 089 166 A2 4/2001
JP 2001-142695 A 5/2001
(Continued)

OTHER PUBLICATIONS

Communication dated Dec. 6, 2016 by the International Searching Authority in counterpart International Patent Application No. PCT/KR2016/002519. (PCT/ISA/210).
(Continued)

*Primary Examiner* — Andy Ho
(74) *Attorney, Agent, or Firm* — Sughrue Mion, PLLC

(57) ABSTRACT

A computing system is disclosed. The computing system according to one embodiment of the present disclosure comprises: a memory device for storing an application program; a processor for executing a loader for loading data of the application program into a memory space allocated for execution of the application program; a local memory having a width corresponding to the size of a register of the processor; and a constant memory having a width smaller than that of the local memory, wherein, according to the size of constant data included in the application program, the processor loads the constant data into one of the local memory and the constant memory.

11 Claims, 12 Drawing Sheets

(51) Int. Cl.
*G06F 12/0888* (2016.01)
*G06F 12/0886* (2016.01)
*G06F 12/0897* (2016.01)
*G06F 8/41* (2018.01)
*G06F 9/30* (2018.01)
*G06F 9/50* (2006.01)
*G06F 12/0891* (2016.01)

(52) U.S. Cl.
CPC ........ *G06F 9/5016* (2013.01); *G06F 12/0886* (2013.01); *G06F 12/0888* (2013.01); *G06F 12/0891* (2013.01); *G06F 12/0897* (2013.01); *G06F 2212/1016* (2013.01)

(58) Field of Classification Search
USPC ...................................................... 712/1, 200
See application file for complete search history.

(56) References Cited

U.S. PATENT DOCUMENTS

| | | | |
|---|---|---|---|
| 6,922,773 B2 * | 7/2005 | Faraboschi | G06F 9/3016 712/221 |
| 7,032,100 B1 | 4/2006 | Fleming et al. | |
| 8,103,858 B2 | 1/2012 | Sperber et al. | |
| 8,806,457 B2 | 8/2014 | Porras et al. | |
| 2002/0087834 A1 | 7/2002 | Faraboschi et al. | |
| 2004/0117599 A1 | 6/2004 | Mittal et al. | |
| 2009/0327665 A1 | 12/2009 | Sperber et al. | |
| 2015/0067300 A1 | 3/2015 | Inoue | |

FOREIGN PATENT DOCUMENTS

| | | |
|---|---|---|
| KR | 10-0199477 B1 | 6/1999 |
| KR | 10-2001-0053658 A | 7/2001 |
| KR | 10-2001-0102201 A | 11/2001 |
| KR | 10-0450312 B1 | 12/2004 |
| KR | 10-2010-0003248 A | 1/2010 |

OTHER PUBLICATIONS

Communication dated Dec. 6, 2016 by the International Searching Authority in counterpart International Patent Application No. PCT/KR2016/002519. (PCT/ISA/237).

* cited by examiner

FIG. 5

| | flag(1bit) | data(7bits) |
|---|---|---|
| 0 | 0 | 0000000 |
| 1 | 0 | 0000000 |
| 2 | 1 | 1100101 |
| 3 | 0 | 0000001 |
| ⋮ | | ⋮ |
| C-1 | 0 | 0000110 |

COMPUTING SYSTEM, AND DRIVING METHOD AND COMPILING METHOD THEREOF

TECHNICAL FIELD

The present invention relates to a computing system, and a driving method and a compiling method thereof, and more particularly, to a computing system for enhanced data access speed of a memory, and a driving method and a compiling method thereof.

BACKGROUND ART

A memory device as one of the constituent components of a computing system is organized in a hierarchical order. Referring to FIG. 1 for explanation, the computing system 90 includes CPU 10 which is an integrated microprocessor performing calculation, a cache 20, and a main memory 30. The cache 10 may be located on an uppermost level nearest to the CPU 10, and the main memory 30 corresponding to a main memory device may be placed under the cache 10. This hierarchical structure may be applied to a hard disk, an optical disk, and mobile medium which are classified as external memory device or auxiliary memory device which is one or two levels lower, but they will not be explained in the present disclosure.

Access speed becomes faster as being located on an upper level of the hierarchical structure of the memory device while a price per bit is expensive. On the contrary, access speed becomes slower as being located on a lower level while a price per bit is cheap. In order to compensate for the disadvantage of the main memory 30 that has a large capacity but slow speed, the computing system 20 includes one or more hierarchical caches 20. In a related art, the cache 20 may be composed of two strata named as L1 and L2.

For reference, the CPU 10 may interchange word which is basic unit for processing of calculation with the cache 20. The word has various lengths such as 64 bits, 46 bits, 32 bits or the like according to the processor design. In describing some embodiments of the present disclosure, a word is described as 32 bits by way of example. Further, the unit of transmission between the cache 20 and the main memory 30 is referred to as a 'block'. The block refers to a number of bits that can be read at once from the main memory 30. Size of the block corresponds to multiples of the word and there are various algorithms provided to select the words which are called by the cache for increased access speed.

However, despite the designs and the algorithms for increased access speed of the computing system, a gap in speeds between the processor and the memory still causes limitation in the enhancement of processing speed. In other words, when cache miss occurs, processing speed rapidly falls down due to load latency.

Meanwhile, as a method for enhancing speed, a related technology has focused on the fact that a zero (0) value is repeatedly loaded from the memory. Although it varies among the applications executed, the frequency of loading a zero (0) value is still as high as 5% to 55% of total load calculation.

The related art will be described below by referring to FIG. 2, in which the cache 20 additionally includes a zero value cache 22 as well as the L1 cache 21 and L2 cache 23. The main memory device 30 may be configured as DRAM. L2 cache 23 may receive transmission of a data block from DRAM 30.

A zero (0) detection logical circuit 40 may detect a zero (0) value loaded to L2 cache 23. Further, the zero (0) detection logical circuit 40 may only transmit data of the detected zero (0) values to the zero value cache 22. By retaining a frequently loaded zero (0) value in the devoted zero value cache 22, speed of the computing system is increased.

However, there are following disadvantages even in this related technology. When data of specific addresses (e.g., 0xa and 0xb) are called according to fetched instruction, the CPU 10 should search data by accessing all of L1 cache 21 and the zero value cache 22 which are arranged on an uppermost level. Because same data should be requested to the two caches, number of wires and electrical power consumption increase. Further, because an additional zero detection logical circuit 40 should be provided to detect a zero (0) value, cost and size increase, and in some cases, there is a risk of further decline in speed.

DISCLOSURE

Technical Problem

Accordingly, an object of the present disclosure is to provide a computing system for enhanced data access speed of a memory, and a driving method and a compiling method thereof.

Technical Solution

In order to accomplish the above-mentioned object, a computing system according to one embodiment of the present disclosure may include a memory device for storing an application program, a processor for executing a loader for loading data of the application program into a memory space allocated for execution of the application program, a local memory having a width corresponding to the size of a register of the processor, and a constant memory having a width smaller than that of the local memory, in which, according to the size of constant data included in the application program, the processor may load the constant data into one of the local memory and the constant memory.

In this case, when a numerical value of the constant data is within a threshold, the processor loads the constant data into the constant memory, and when the numerical value of the constant data is above the threshold, and the processor may load the constant data into the local memory In this case, among instructions included in the application program, the processor may substitute a general load instruction of loading the constant data within the threshold into a target register, with a constant load instruction of loading from the constant memory.

Meanwhile, the threshold may be the largest size that can be expressed by a bit stream that is narrower by 1 bit than the width of the constant memory.

In this case, the processor may perform calculation according to the instructions included in the application program, and when performing the calculation for loading data from the constant memory, the processor may insert a leading-zero to allow the data of the constant memory to correspond to the size of the register of the processor.

In this case, when performing the calculation for loading data from the constant memory, and when a most significant bit (MSB) at an accessed location is 1, the processor may load data of the local memory based on the loaded data.

Meanwhile, the local memory and the constant memory may be configured as one of static random access memory (SRAM), scratch pad memory (SPM) and tightly coupled memory (TCM).

Meanwhile, a driving method of a computing system according to one embodiment of the present disclosure may include comparing a numerical value of constant data constructing an application program with the threshold, loading constant data having the numerical value within the threshold as a result of the comparison to a constant memory, and loading the rest data other than the constant data into a local memory.

The driving method may further include, among instructions included in the application program, substituting a general load instruction of loading the constant data into a target register, with a constant load instruction of loading from the constant memory.

Meanwhile, the driving method described above may further include writing, in the constant memory, the offset indicating a location that stores the rest data loaded to the local memory.

In this case, the writing in the constant memory may further include setting a flag to distinguish the offset and the constant data.

In this case, when width of the local memory corresponds to a size of a register of a processor of the computing system, when a width of the constant memory is smaller than a width of the local memory, and when performing calculation for loading data from the constant memory, the driving method may further include inserting a leading-zero to allow data of the constant memory to correspond to the size of the register of the processor.

In this case, when performing the calculation for loading data from the constant memory and when the flag set to the loaded data is 1, the driving method may further include determining the loaded data to be offset and loading data from the local memory based on the offset.

Meanwhile, a compiling method of an application program code according to one embodiment of the present disclosure may include determining whether a numerical value of constant data of an application program code is within a threshold, and assembling the constant data determined as having the numerical value within the threshold with a constant data section of a binary file.

In this case, the compiling method may further include assembling the rest data except for the constant data within the threshold of the application program code, to a general data section of the binary file.

Meanwhile, the compiling method may further include generating a constant load instruction for loading data of the constant data section or generating a general load instruction for loading data of the general data section.

Advantageous Effects

According to the above various embodiments, the computing system, the driving method and the compiling method may avoid speed decline due to repetitive access of zero (0) values to the main memory, without requiring additional hardware logic configuration and repeated data requests.

DESCRIPTION OF DRAWING

The above and/or other aspects and advantages of the present invention will become apparent and more readily appreciated from the following detailed description, taken in conjunction with the accompanying drawings, in which:

FIG. 5 is a diagram illustrating memory structure of a constant memory according to one embodiment of the present disclosure;

BEST MODE

Hereinbelow, preferred exemplary embodiments of the present disclosure will be described in detail with reference to the accompanying drawings. In the following description of the present disclosure, a detailed description of known functions and configurations incorporated herein will be omitted when it may make the subject matter of the present disclosure rather unclear. In addition, terms used herein are defined in consideration of functions of the present disclosure, and may be varied according to practices of the users or operators. Therefore, definition should be interpreted based on the entire description of the present disclosure.

Figure 3:
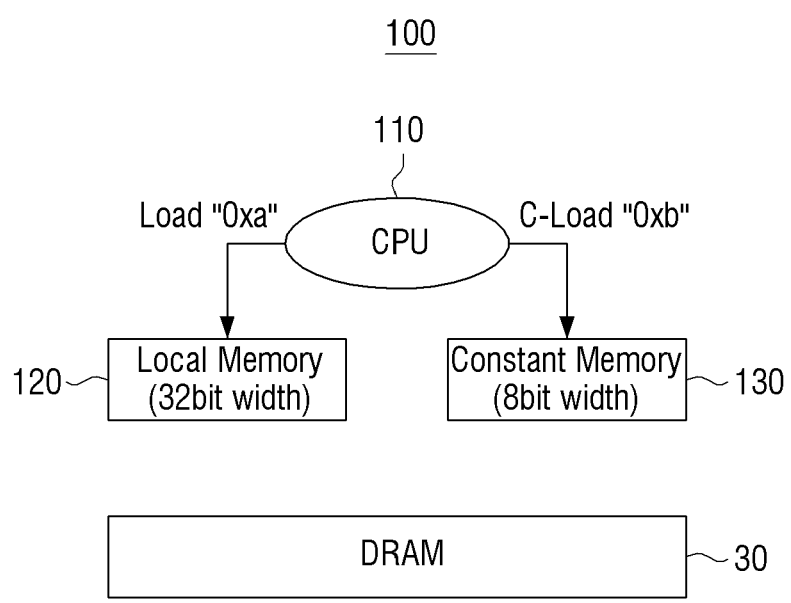
FIG. 3 is a block diagram illustrating a configuration of a computing system according to one embodiment of the present disclosure.

FIG. 3 is a block diagram illustrating a configuration of a computing system according to one embodiment of the present disclosure.

Referring to FIG. 3, the computing system 100 includes a processor 110 (CPU), a local memory 120, a constant memory 130 and a memory device 30 (DRAM).

The memory device 30 may store application programs. Specifically, the memory device 30 may store application programs to be executed. Among the application programs stored in a sub-storage such as auxiliary memory device, the memory device 30 may load an application program that is designated to be executed.

The memory device 30 may be configured as various types of memory. Although FIG. 3 exemplifies DRAM as an example, the embodiment is not limited hereto, and accordingly, the memory device 30 may be configured as a high-speed semiconductor memory such as flash memory.

The processor 110 executes the loader. The loader is a program provided to perform functions of allocation, linking, relocation and loading. Among the above, loading is the function related with the loader. The loading is an operation of the processor 110 for reading from an auxiliary memory device or an external memory device to a register for writing an object of calculation (operand). The loader may be a service program that drives the computing system 100 and that is included in an operating system for executing the application programs.

The local memory 120 and the constant memory 130 are located on an upper level of the memory device 30. The local memory 120 and the constant memory 130 are distinct from each other. The local memory 120 may be a physically separated component from the constant memory 130 or may represent two independent regions which are divided from each other in one memory.

The local memory 120 may have a width corresponding to the size of the register of the processor 110. Specifically, the local memory 120 may be configured on the basis of a unit that corresponds to the word. For example, the local memory 120 has a width of 32 bits.

Differently from the above, the constant memory 130 has a different width from that of the local memory 120. In other words, the constant memory 130 may be configured on the basis of a unit that is smaller than the word. For example, the constant memory 30 has a width of 8 bits.

The processor 110 may execute a loader to load the data included in an application program stored in DRAM 30 to the local memory 120 or the constant memory 130. Specifically, the processor 110 may load the constant data into one of the local memory 120 and the constant memory 130 according to size of the constant data included in the application program. In this example, the size of the constant data refers to constant values indicated by the constant data, rather than amount of data. As a constant value increases, the size for representing the constant increases. For example, all variables declared as integer are expressed by data amount of 32 bits, but the size of constant indicated by the data may be varied such as 0 and 128.

The processor 110 may compare a numerical value of the constant data with a threshold to load constant data into one of the local memory 120 or the constant memory 130. Specifically, the processor 110 may load the numerical value to the constant memory 130 when a numerical value of the constant data is within the threshold, and loads the numerical value to the local memory 120 when the numerical value of the constant data is above the threshold.

In this example, comparison with the threshold may be implemented in various manners. For example, the loader may perform the comparison based on a difference between 127 and a numerical value of the constant data. Alternatively, the loader may perform the comparison based on whether a binary number expressing a numerical value is within 7 digits or not.

Meanwhile, the threshold is determined according to the width of the constant memory 130. When the constant memory 130 can contain data by a width of 1 bit, the threshold is 0. According to one embodiment of the present disclosure, the threshold is a largest number that can be expressed by the bit stream that is narrower by 1 bit than the width of the constant memory 130. In the embodiment described above, the constant memory 130 may have a width of 8 bits, and therefore, the threshold may be 127 which is largest size that can be expressed by 7 bits. In this example, the rest 1 bit of the constant memory 130 is the place for flag which will be explained below. For the constant data within 127, only the latter 7 digits are significant. In other words, the constant memory 130 may load the latter part of the constant data within the threshold.

Among the instructions included in an application program, the processor 110 may substitute the general load instruction of loading the constant data within the threshold, with the constant load instruction of loading from the constant memory 130. Specifically, the processor 110 may search the instructions of an application program for a general load instruction of loading the constant data within the threshold. Further, the processor 110 may confirm whether addresses of the data loaded by the general load instruction are addresses of the constant data having a size within the threshold. Addresses of the constant data may be recognized during a process of loading the application program to DRAM 30. The processor 110 may substitute the general load instruction of calling data from the local memory 120 with the constant load instruction of calling from the constant memory 130. Based on the above, when calculation required by the constant data within the threshold is performed, the processor 110 may access the constant memory 130.

The processor 110 performs the application program. The processor 110 may perform calculation according to the instruction included in the application program. Further, when the processor 110 performs calculation for loading data from the constant memory 130, the leading-zero may be inserted into the data of the constant memory 130 so as to correspond to the size of the register. Further explanation will be provided below by referring to FIG. 6.

When calculation for loading the data from the constant memory 130 is performed, the processor 110 may load data from the local memory 120 based on the loaded data according to a most significant bit of the accessed position. Further explanation will be provided below by referring to FIG. 5.

The local memory 120 and the constant memory 130 may be configured as one of static random access memory (SRAM), scratch pad memory (SPM), or tightly coupled memory (TCM).

The computing system 100 according to the embodiment described above is expected to provide an enhanced processing speed in executing of an application program, because the computing system 100 loads a low-numbered constant data including 0 to a separate constant memory.

Figure 4:
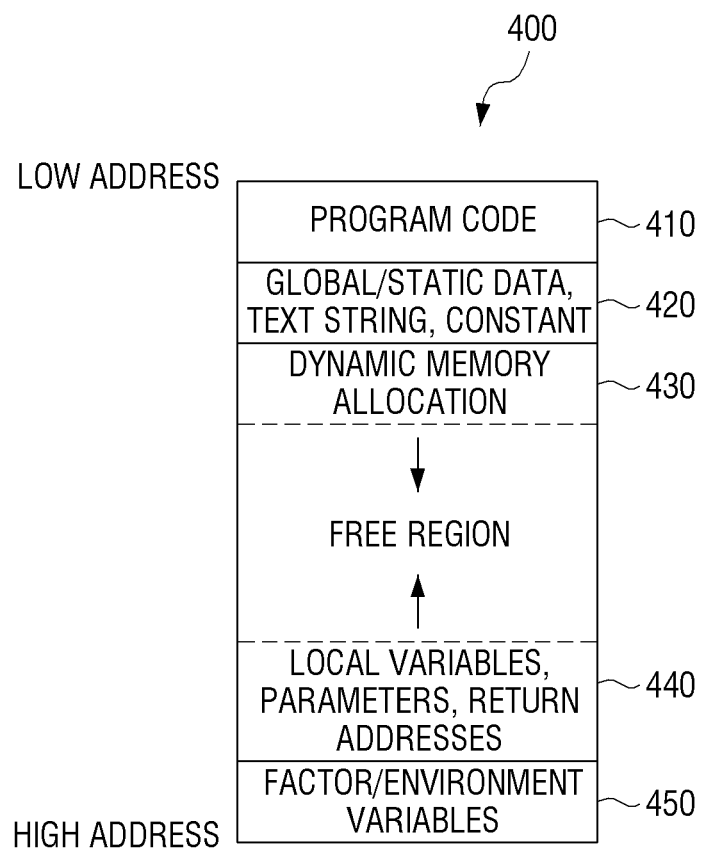
FIG. 4 is a diagram illustrating an example of a memory structure of an application program loaded to a main memory device.

FIG. 4 is a diagram illustrating an example of a memory structure of an application program loaded to a main memory device.

Referring to FIG. 4, binary file 400 structure of an application program loaded to DRAM 30 may be largely divided into four regions. In the order from lower to higher addresses, the binary file 400 is divided into a code region 410, a data region 420, a heap region, and a stack region 440, 450.

The code region 410 may include instructions (or 'execution code') of a program. The code region 410 may be also be called as 'text region'. The processor may execute an application program by reading this region.

The data region 420 includes information which should be secured for the lifetime of a program, such as global data, static data, text string, constant, or the like.

The heap region 430 is space for dynamic memory allocation. In other words, this space is dynamically allocated by a programmer. Unlike this, the stack regions 440, 450 are stored with automatic/temporary variables when calling a function. Specifically, the stack region 440, 450 may be composed of a region 450 where arguments of functions and environment variables are stored, and an increasing and decreasing region 440 such as local variables, parameters, return addresses or the like.

According to one embodiment of the present disclosure, the constant data included in the data region 420 may be loaded to the constant memory. The constant memory having narrow width including 0 enhances read speed of the processor.

Figure 5:
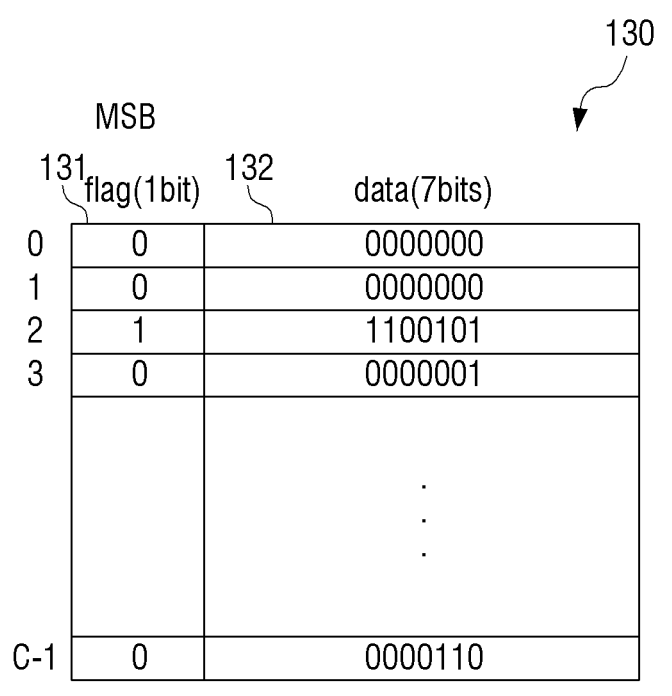

FIG. 5 is a diagram illustrating memory structure of a constant memory according to one embodiment of the present disclosure.

Referring to FIG. 5, the constant memory 130 has a width of 8 bits. Further, the constant memory 130 may be composed of C number of lines. One line having width of 8 bits is divided into a flag 131 and a data region 132. The flag 131 is the most significant bit (MSB) of each line and the data region 132 is a bit stream of the rest 7 bits of the width.

The most significant bit (MSB) is the flag 131 for distinguishing the data of the corresponding line. Specifically, when a bit value of the flag is 0, data of the corresponding line is constant data. Further, when a bit value of the flag is 1, data of the corresponding line is offset.

An example of processing when a bit value of the flag 131 is 0 will be explained by referring to FIG. 6.

Figure 6:
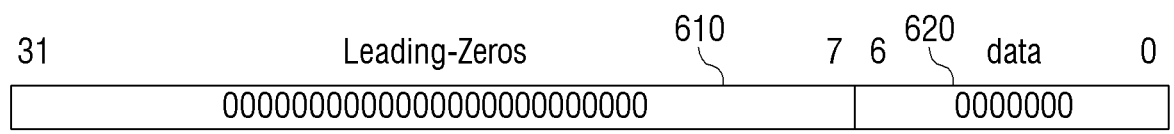
FIG. 6 is a diagram provided to describe a structure attached with leading-zero according to one embodiment of the present disclosure.

FIG. 6 is a diagram provided to describe a structure attached with leading-zero according to one embodiment of the present disclosure.

FIG. 6 illustrates processing when a bit value of the flag 131 corresponding to data of the constant memory 130 of FIG. 5 is 0. Specifically, CPU calls constant data from the constant memory 130 according to constant load instruction. The constant value of the called data is zero.

However, since the length of the called constant data is 7 bits, the 7-bit-long may be expanded to be 32 bits to be loaded to the 32-bit-long register. Specifically, 0, which is 25-bit-long, is inserted in front of the 7-bit-long constant data. These zero (0) bits inserted on the front end are called as leading-zeros.

Figure 7:
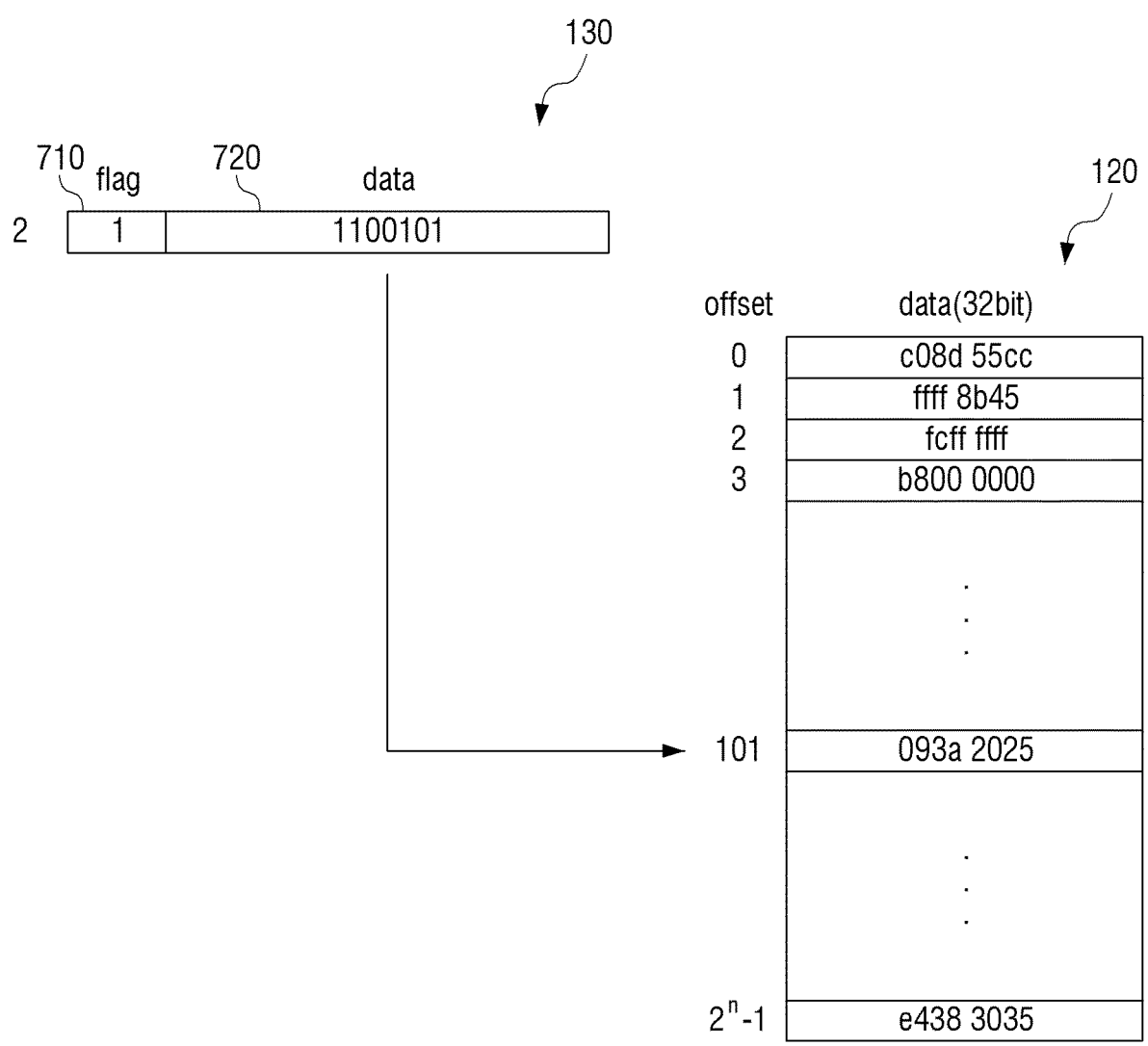
FIG. 7 is a diagram provided to describe exception handling according to one embodiment of the present disclosure.

FIG. 7 is a diagram provided to describe exception handling according to one embodiment of the present disclosure.

Referring to FIG. 7, FIG. 7 illustrates processing when a bit value of the flag 131 corresponding to data of the constant memory 130 in FIG. 5 is 1. Specifically, CPU may call data from the constant memory 130 according to constant load instruction. In this example, the called address may be a series of address ranges, e.g., array-declared data or data address of a structure.

To be prepared for the circumstance mentioned above, the constant memory 130 may store offset. Specifically, the constant memory 130 may store offset pointing to a specific address of the local memory 120. Further, the constant memory 130 may store a bit value '1' for identifying the offset in the flag 131.

Referring to the example of FIG. 7, Line 2 of the constant memory 130 may be loaded according to the constant load instruction. Further, the MSB 710 of loaded Line 2 may be checked. When the bit value of the flag is 1, CPU performs exception handling. In other words, when the MSB is 1 during constant load calculation, CPU may not complete the constant load calculation, but instead return the offset and exit the constant load.

CPU performs general load calculation again with the offset, as an exception handling. Specifically, CPU may recognize a numerical value written on the 7-bit-long data region 720 of the loaded Line 2, and call for data of the local memory 120 located in the offset. In the illustration of FIG. 7, the offset 1100101 (2) refers to general data 093a 2025 (101) of the general data of the local memory 120. CPU may load 093a 2025 (16) from the local memory 120.

Meanwhile, a starting point where the offset is counted in the local memory 120 may not match the first address of the local memory 120. The offset may be a number indicating a point that is counted from a preset location of the local memory 120.

Meanwhile, the capacity of the local memory 120 may correspond to the length of the offset of the constant memory 130. For example, the offset length of the constant memory 130 is 7 bits. The largest size of the offset that can be expressed by 7 bits is $2^7$, that is, 127. Accordingly, the capacity of the local memory 120 is 27*32 bits, which has a width of 32 bits and is composed of 127 lines. However, the present disclosure may not be limited hereto. Accordingly, the local memory 120 may have a larger capacity as long as the offset can point to correct data from a preset location.

Figure 8:
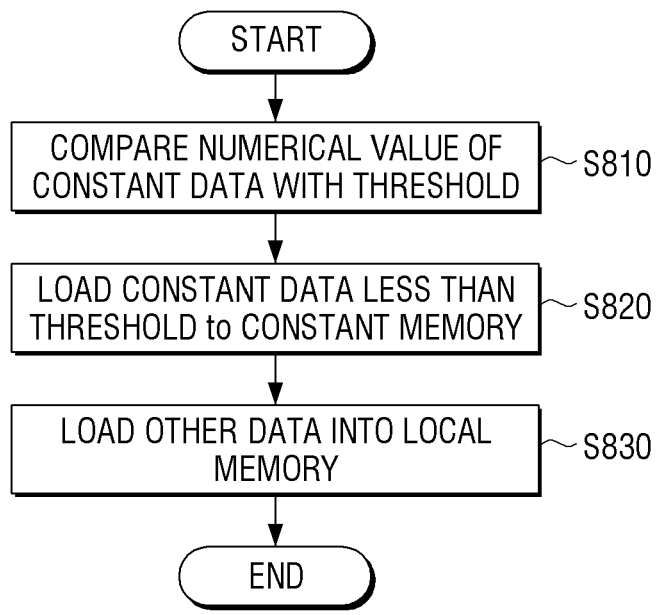
FIG. 8 is a flowchart provided to describe a driving method according to one embodiment of the present disclosure.

FIG. 8 is a flowchart provided to describe a driving method according to one embodiment of the present disclosure.

Referring to FIG. 8, a numerical value of the constant data may be compared with the threshold, at S810. Specifically, the driving method includes comparing constant of data included in an application program with the threshold.

The constant data within the threshold may be loaded to the constant memory, at S820. Specifically, the driving method includes loading the constant data having the numerical value within the threshold to a separate constant memory.

The rest data may be loaded to the local memory, at S830. Specifically, the driving method includes loading the constant data exceeding the threshold or the rest general data into the local memory except for the constant data loaded to the constant memory.

Meanwhile, the driving method described above may further include writing, in the constant memory, the offset indicating a location that stores the rest data loaded to the local memory. In this example, the writing may further include setting the flag for dividing the offset and the constant data. For example, when the constant data is loaded, MSB may be set to 0, and when the offset is written, MSB may be set to 1. CPU may then recognize whether the written data is constant data or offset, based on the value of the flag.

The driving method according to the embodiment described above may enhance performance of the computing system by loading the constant data having high load frequency to a memory region.

Figure 9:
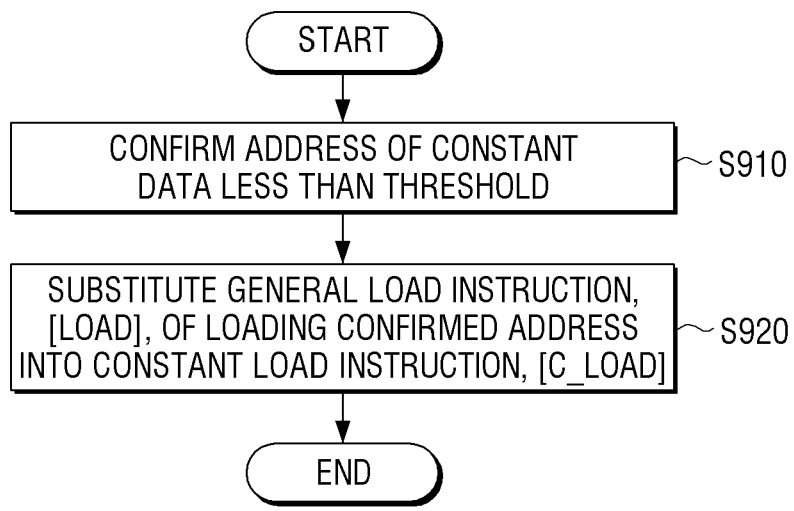
FIG. 9 is a flowchart provided to describe pre-processing of a loader according to one embodiment of the present disclosure.

FIG. 9 is a flowchart provided to describe pre-processing of a loader according to one embodiment of the present disclosure.

The operations in FIG. 9 are provided together with the operations of the method in FIG. 8. Referring to FIG. 9, in the beginning step, the computing system may read the data region of an application program. the address of the constant data within the threshold is then checked, at S910. Specifically, the computing system may check the address of the constant data within the threshold loaded to the constant memory, by performing the operations of comparing at S810 and loading the constant data at S820, as illustrated in FIG. 8.

Next, the general load instruction, [LOAD], of loading the checked address may be substituted with a constant load instruction, [C_LOAD], at S920. In this example, LOAD is a common assembly language used for calculation for calling data at the address and loading it to the register. When calculation is performed by LOAD instruction, CPU may access the local memory. C_LOAD is a modified assembly language that directs an access path to call the data at the address toward the constant memory. The operation at S920 is a process of reconfiguring an application program so that the constant data within the threshold can be loaded to the constant memory.

Meanwhile, the width of the constant memory written with the constant data within the threshold may be narrower than the width of the local memory corresponding to size of the register of the processor. In this case, the driving method described above may further include inserting leading-zero, in which case the data of the constant memory can correspond to size of the register of the processor when calculation for loading data from the constant memory is performed according to C_LOAD instruction.

Further, exception handling may be performed according to the flag set as described above. Specifically, when the calculation for loading data from the constant memory is performed and when the flag set for the loaded data is 1, the operating method described above may determine that the loaded data is offset and load data from the local memory based on the offset.

Figure 10:
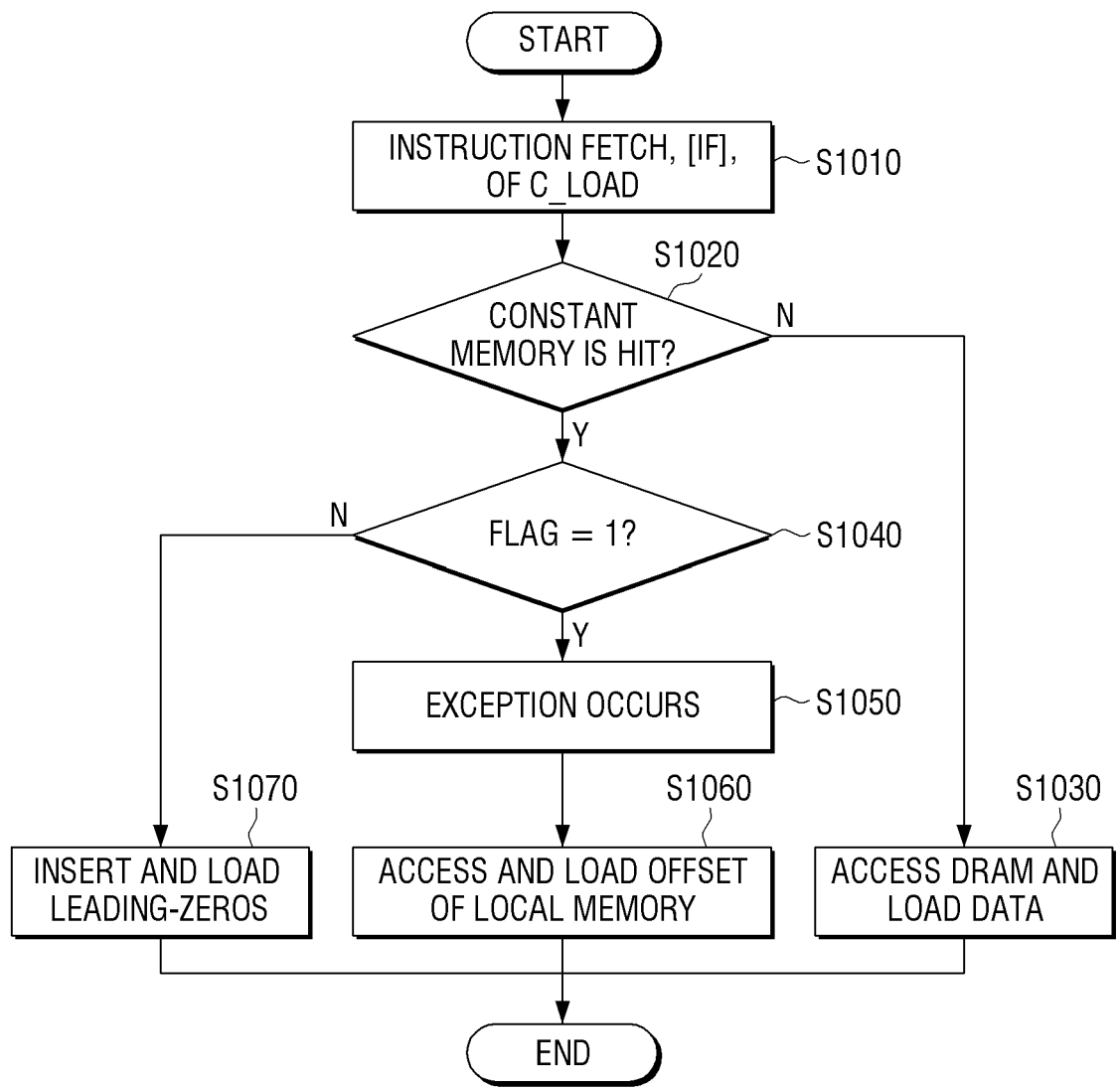
FIG. 10 is a flowchart provided to describe a loading method according to one embodiment of the present disclosure.

FIG. 10 is a flowchart provided to describe a loading method according to one embodiment of the present disclosure.

Referring to FIG. 10, a processor of the computing system may perform instruction fetch (IF) from a code region of the main memory. In this example, the processor may fetch instruction including C_LOAD, at S1010. Further, the processor may access the constant memory.

It is then determined whether the constant memory includes data at searched address or not, at S1020. In other words, it may be determined whether a hit, in which the constant data is present on the constant memory, or a miss, in which the constant data is not present on the constant memory, is generated.

When the data is missed at S1020:N, a sub-level DRAM may be accessed to load data corresponding to the address, at S1030.

When the data is hit at S1020:Y, it may be determined whether a bit value of the flag at the accessed location is 1 or not, at S1040. Specifically, the processor checks whether the MSB at a line of the accessed constant memory is 1 or not, based on the address.

When the flag value is 0 at S1040:N, leading-zero may be inserted in front of the data in the data region before loading to the register.

When a flag value is 1 at S1040:Y, exception handling may be performed, at S1050. The processor may access the local memory based on the loaded offset, and load the general data at the offset location once again, at S1060.

The loading method according to the embodiment described above is capable of efficient loading of data even when the computing system is configured with two separate memories having different widths from each other.

Meanwhile, the operating method and loading method of FIGS. 8 to 10 may be executed in the computing system of FIG. 3. Further, the operating method and loading method described above may be configured as at least one execution program for implementing the processes of the methods in the computing system described above, and such execution program may be stored in a computer readable recording medium. Accordingly, the flowcharts of FIGS. 8 to 10 described above may be executed as program codes on computer readable recording medium.

Figure 11:
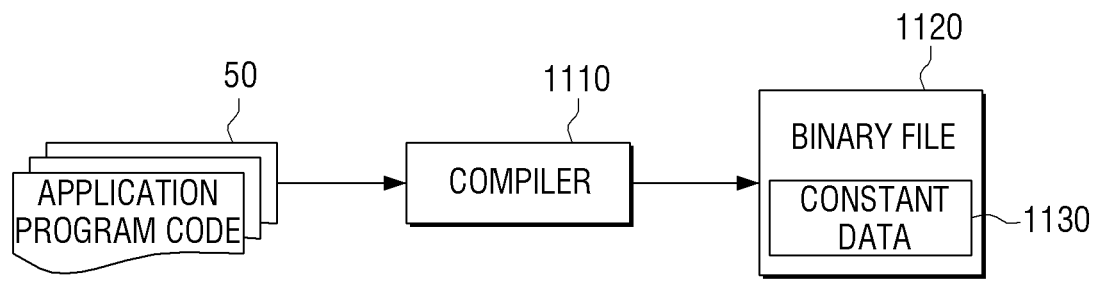
FIG. 11 is a block diagram provided to describe a compiling method according to one embodiment of the present disclosure.

FIG. 11 is a block diagram provided to describe a compiling method according to one embodiment of the present disclosure.

Referring to FIG. 11, an application program code 50 which is written in high level language that can be easily recognized by humans may be converted into language that can be recognized by machines by a compiler 1110. The converted language is called binary file 1120 or binary code. The compiler is a program executed by the computing system.

According to one embodiment of the present disclosure, the complier 1110 may aggregate the constant data within the threshold from the application program code. Specifically, the compiler 1110 may determine whether a numerical value of the constant data from the application program code is within the threshold or not. Further, the compiler 1110 may assemble constant data determined to have a numerical value within the threshold into a constant data section of the binary file. As illustrated in FIG. 4, the memory structure 400 of an application program loaded to DRAM includes the data region 420. In this example, the compiler 1110 may only aggregate the constant data having numerical value within the threshold from the constant data included in the data region 420, and write them in one space.

As described above, because the compiler 1110 compiles the constant data including zero (0) showing high frequency in aggregation, the same effect as if a devoted constant memory is installed, can be obtained. When the locality principle for effective operation of the cache is applied, further enhancement of performance can be expected.

Figure 12:
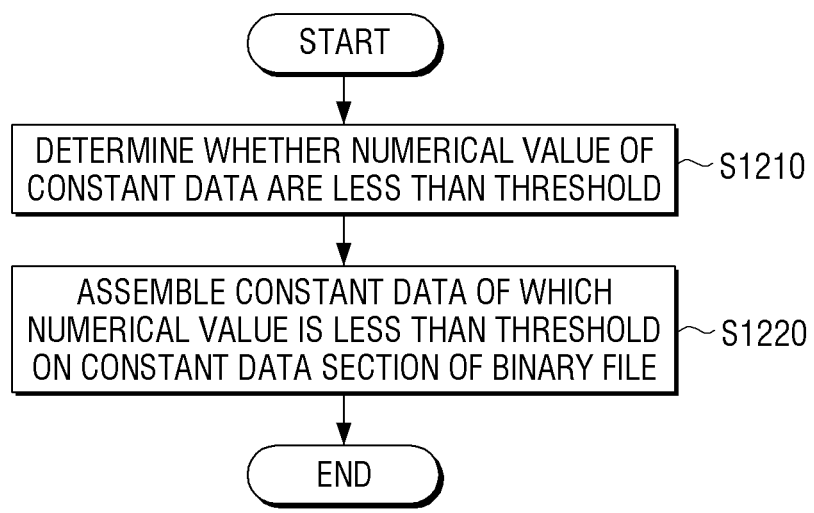
FIG. 12 is a flowchart provided to describe the compiling method of FIG. 11.

FIG. 12 is a flowchart provided to describe the compiling method of FIG. 11.

Referring to FIG. 12, it may be determined whether a numerical value of the constant data is within the threshold or not, at S1210. Specifically, the compiling method may include recognizing the data declared as a constant among the application program code, and determining whether the recognized numerical value of the constant data is within the threshold or not. When the compiling method is executed in the computing system of FIG. 3, the threshold may be determined according to a unit length of the data region in the constant memory 130. When the unit length is 7 bits, the threshold is 127. Alternatively, even when the compiling method is executed in the general computing system, the threshold may be determined to be arbitrary numerical value that can include 0.

The constant data determined as having the numerical value within the threshold may be assembled into the constant data section of the binary file, at S1220. Specifically, the compiling method may aggregate the constant data within the threshold to one section of the binary file for executing of an application program. Any independent section distinguished from the other data may be used as the one section.

The compiling method described above may further include assembling the rest data except for the constant data within the threshold among the application program code, to a general data section of the binary file. For example, the general data section may be the region other than the constant data section among the data regions 420 of FIG. 4.

Further, according to application program code, the compiling method described above may further include generating constant load instruction, [C_LOAD], for loading data of the constant data section or generating general load instruction, [LOAD], for loading data of a general data section. In other words, the compiler may compile the constant load instruction, [C_LOAD], for loading the constant data from the constant data section, rather than the general load instruction, [LOAD], when converting the program code into the assembly language of calculation for loading the constant data within the threshold. Accordingly, in the stage of executing the application program, the load calculation may be performed for calling data from the distinguished sections from each other according to [LOAD] and [C_LOAD] instructions.

By sectioning a storing region, the compiling method described above may reduce time required for the load calculation for accessing low-numbered constant including 0 when executing an application program, thus facilitating enhancement of the overall speed of the computing system.

Figure 1:
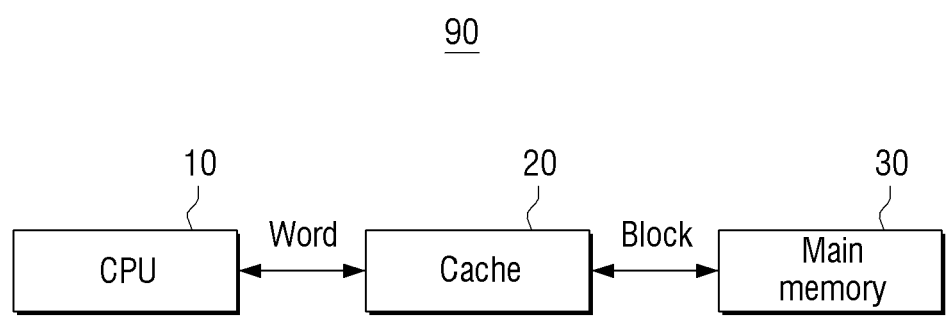
FIG. 1 is a block diagram provided to describe a general configuration of a related computing system.
Figure 2:
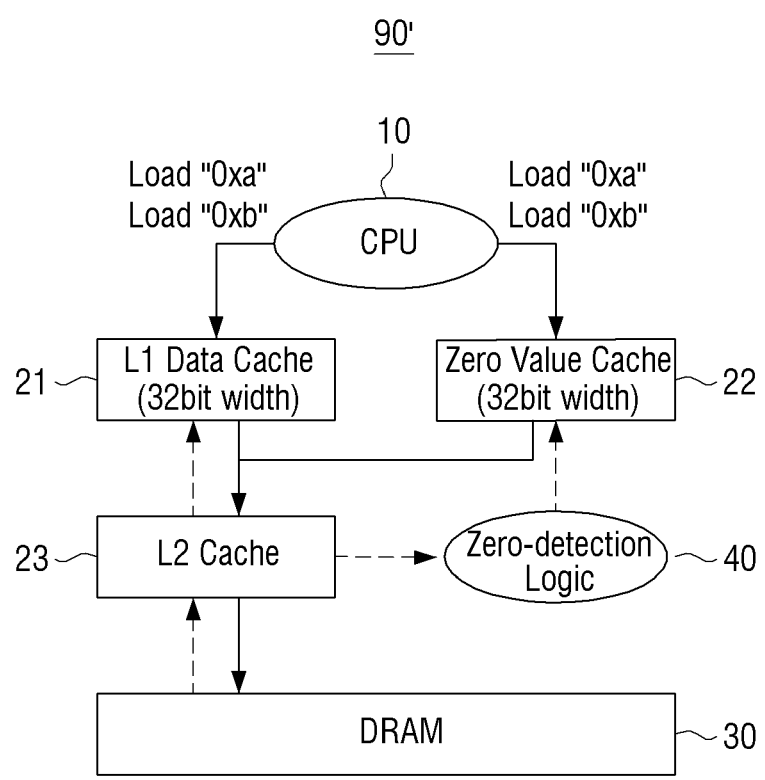
FIG. 2 is a block diagram illustrating a configuration of a related computing system.

The compiling method described above may be also performed in the computing system including the configuration of FIGS. 1 to 3, and in the computing system including another configuration.

Further, the compiling method described above may be configured as at least one execution program to perform the compiling method described above, and such execution program may be stored in computer readable recording medium.

Accordingly, each block of the present disclosure may be performed as computer recording code on computer readable recording medium. The computer readable recording medium may be device that can store data to be read by a computer system.

For example, the computer readable recording medium may be ROM, RAM, CD-ROMs, magnetic tape, floppy disk, optical disk, optical data storing device and image display apparatus such as television including the storing devices described above. Further, the computer readable code may be performed as computer data signals of carrier wave.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

The invention claimed is:

1. A computing system, comprising:
a memory device for storing an application program;
a processor for executing a loader for loading data of the application program into a memory space allocated for execution of the application;
a local memory having a width corresponding to a size of a register of the processor; and
a constant memory having a width smaller than that of the local memory,
wherein, according to a size of constant data included in the application program, the processor loads the constant data into one of the local memory and the constant memory, and
wherein, among instructions included in the application program, the processor substitutes a general load instruction of loading the constant data, which is loaded into the constant memory, within a threshold into a target register, with a constant load instruction of loading from the constant memory.

2. The computing system of claim 1, wherein, when a numerical value of the constant data is within the threshold, the processor loads the constant data into the constant memory, and when the numerical value of the constant data is above the threshold, and the processor loads the constant data into the local memory.

3. The computing system of claim 2, wherein the threshold is the largest size that can be expressed by a bit stream that is narrower by 1 bit than the width of the constant memory.

4. The computing system of claim 3, wherein the processor performs calculation according to instructions included in the application program, and when performing the calculation for loading data from the constant memory, inserts a leading-zero to allow the data of the constant memory to correspond to the size of the register of the processor.

5. The computing system of claim 4, wherein, when performing the calculation for loading data from the constant memory, and when a most significant bit (MSB) at an accessed location is 1, the processor loads data of the local memory based on the loaded data.

6. The computing system of claim 1, wherein the local memory and the constant memory are configured as one of static random access memory (SRAM), scratch pad memory (SPM) and tightly coupled memory (TCM).

7. A driving method of a computing system, comprising:
comparing a numerical value of constant data constructing an application program with a threshold;
among instructions included in the application program, substituting a general load instruction of loading the constant data into a target register, with a constant load instruction of loading from a constant memory;
loading constant data having the numerical value within the threshold as a result of a comparison to the constant memory; and
loading the rest data other than the constant data into a local memory.

8. The driving method of claim 7, further comprising: writing in the constant memory an offset that indicates a location that stores the rest data in the local memory.

9. The driving method of claim 8, wherein the writing in the constant memory further comprises setting a flag to distinguish the offset and the constant data.

10. The driving method of claim 9, wherein, when width of the local memory corresponds to a size of a register of a processor of the computing system, when a width of the constant memory is smaller than a width of the local memory, and when performing calculation for loading data from the constant memory, the method further comprises inserting a leading-zero to allow data of the constant memory to correspond to the size of the register of the processor.

11. The driving method of claim 10, wherein, when performing the calculation for loading data from the constant memory and when the flag set to the loaded data is 1, the method further comprises determining the loaded data to be offset and loading data from the local memory based on the offset.

* * * * *